(12) United States Patent
Merz (10) Patent No.: US 9,637,328 B1
(45) Date of Patent: May 2, 2017

(54) CONTAINER RAMP

(71) Applicant: Friedrich Merz, Kelowna (CA)

(72) Inventor: Friedrich Merz, Kelowna (CA)

( * ) Notice: Subject to any disclaimer, the term of this patent is extended or adjusted under 35 U.S.C. 154(b) by 0 days.

(21) Appl. No.: 15/239,459

(22) Filed: Aug. 17, 2016

(51) Int. Cl.
*B65G 69/30* (2006.01)
*B65G 69/28* (2006.01)

(52) U.S. Cl.
CPC ................... *B65G 69/287* (2013.01)

(58) Field of Classification Search
CPC ................ B65G 69/28; B65G 69/30
USPC .................................. 14/69.5, 71.3
See application file for complete search history.

(56) References Cited

U.S. PATENT DOCUMENTS

| | | | | |
|---|---|---|---|---|
| 1,232,437 A * | 7/1917 | Simpson | ................ | B65G 69/30 14/69.5 |
| 2,199,097 A * | 4/1940 | Chappelle | ................ | B60P 1/52 193/35 R |
| 2,355,867 A | 8/1942 | Jarvis | | |
| 2,592,919 A * | 4/1952 | Loomis | ............. | B65G 69/2858 14/71.3 |
| 2,597,213 A * | 5/1952 | Whiteman | ............. | B65G 69/30 14/72.5 |
| 2,659,914 A * | 11/1953 | Law | ....................... | B65G 69/30 14/69.5 |
| 2,880,431 A * | 4/1959 | Noland | ..................... | B62B 1/00 126/304 R |
| 3,192,546 A * | 7/1965 | Noland | ..................... | B60P 1/43 14/69.5 |
| 3,628,209 A * | 12/1971 | Parent | ..................... | B63B 25/20 14/71.1 |
| 3,639,935 A | 2/1972 | Kumpolt | | |
| 3,881,207 A * | 5/1975 | Jones, Jr. | ........... | B65G 69/2841 14/69.5 |
| 4,075,729 A | 2/1978 | Conner | | |
| 4,087,876 A * | 5/1978 | Fillman | .................. | B65G 69/30 14/72.5 |
| 4,209,869 A | 7/1980 | Trine et al. | | |
| 4,559,659 A * | 12/1985 | Hunter, Jr. | ............. | A61G 3/061 105/436 |
| 4,624,446 A * | 11/1986 | Gould | .................. | B65G 69/006 254/88 |
| 5,035,565 A | 7/1991 | White | | |
| 5,065,468 A * | 11/1991 | Sherrod | .................. | B65G 7/04 14/72.5 |
| 5,199,150 A * | 4/1993 | Mortenson | ............. | B60P 1/431 14/71.1 |

(Continued)

*Primary Examiner* — Gary Hartmann
(74) *Attorney, Agent, or Firm* — Janeway Patent Law PLLC (57) ABSTRACT

An apparatus for selectively providing access to a storage container having a door spaced above a floor of the container to provide access to an interior thereof comprises a shaft securable to said storage container at a position below said door and rotatable relative thereto and at least one lever arm extending from said shaft. The apparatus further includes at least one ramp extending between first and second ends, wherein said first end is supported on a surface proximate to said container. The at least one ramp is pivotally supported by distal ends of said at least one lever arms so as to be movable from a first position wherein said second end of said at least one ramp is positioned in front of said container to a second position wherein said second end of said at least one ramp is supported on said container as said shaft is rotated.

20 Claims, 4 Drawing Sheets (56) References Cited

U.S. PATENT DOCUMENTS

| | | | | |
|---|---|---|---|---|
| 5,253,410 A * | 10/1993 | Mortenson | ............... | B60P 1/431 14/71.1 |
| 5,829,947 A * | 11/1998 | Litten | ...................... | B60P 1/43 14/71.3 |
| 5,947,231 A * | 9/1999 | Raab | ...................... | A61G 3/063 187/200 |
| 6,536,064 B1 * | 3/2003 | Swink | .................... | B65G 69/30 14/69.5 |
| 6,708,361 B1 | 3/2004 | Emerson, Jr. | | |
| 6,745,422 B1 * | 6/2004 | Emerson, Jr. | .......... | B65G 69/30 14/69.5 |
| 7,162,761 B2 * | 1/2007 | Alexander | ......... | B65G 69/2841 14/71.1 |
| 7,310,843 B1 | 12/2007 | Mitchell | | |
| 7,930,788 B1 | 4/2011 | Beilstein | | |
| 8,156,595 B2 * | 4/2012 | Budd | .................... | A61G 3/061 14/71.3 |
| 9,051,136 B2 * | 6/2015 | Leum | ................... | B65G 69/287 |

* cited by examiner

CONTAINER RAMP

BACKGROUND OF THE INVENTION

1. Field of Invention

The present invention relates generally to ramps used to load and unload shipping and storage containers, and in particular to a ramp which may be attached to a container and pivoted into position.

2. Description of Related Art

The movement and storage of goods throughout the world has been standardized with the use of standard intermodal containers, also known as shipping or storage containers. These containers are built to have standard dimensions, such that they can be transported using a variety of modes of transport, including ships, trains and trucks. The dimensions of the containers are specified in the ISO 668 standard, set by the International Organization of Standards. For example, a container may be loaded in a foreign country, transported via truck from the manufacturer to a seaport, loaded onto a ship then transported via ship to another seaport, unloaded from the ship and loaded onto a train, transported via train to a storage facility, then finally transported via truck to its final destination, where the goods are unloaded.

A container may be loaded and unloaded over an extended period of time, depending on the schedule of the shipper or receiver. At times the containers may be located in semi-permanent locations, such as in a storage facility or outside of a home or business during renovations or construction. The container may be used, for example, to store personal belongings, or it may be used to store construction materials, which must be accessed regularly, but securely locked when not in use. When a container is used for a longer period of time, it may be loaded and unloaded several times while remaining in place. Typically, a forklift or hand truck is used to move the contents in and out of the container.

When a container is loaded or unloaded, it is often removed from the transport vehicle and placed on a dock, placement pad or directly onto the ground. The base of the container may be supported by blocks to elevate and level the container. Regardless of whether blocks are used, the inside floor of the container is at a level above that of the surface on which it is placed; typically, the floor is about 5-7 inches higher.

To bridge the height difference, typically a sheet of plywood or a metal plate is used as a ramp between the inside floor of the container and the outside placement surface. This type of ramp can be a safety hazard, as it is not secured to the container and could slip from the edge of the container, possibly causing injury to a user, or causing damage to product being moved over the ramp. For many containers, such ramps will interfere with the proper closing of the door and will therefore need to be removed prior to closing such doors. It will be appreciated that ramps may be heavy and difficult to lift onto or lower from the edge of the container by hand, depending upon the material used.

U.S. Pat. No. 7,310,843 B1 (Mitchell) describes a ramp which may be secured to a standard shipping container, but it is not permanently secured and it does not include a lifting mechanism to raise it into place. Other ramps include lifting mechanisms, but are not designed to be permanently attached to a container. Examples of ramps with lifting mechanisms are U.S. Pat. No. 4,075,729 (Conner) and U.S. Pat. No. 4,209,869 (Trine et al.).

SUMMARY OF THE INVENTION

According to a first embodiment of the present invention there is disclosed an apparatus for selectively providing access to a storage container having a door spaced above a floor of the container to provide access to an interior thereof, the apparatus comprising a shaft securable to said storage container at a position below said door and rotatable relative thereto and at least one lever arm extending from said shaft. The apparatus further includes at least one ramp extending between first and second ends, wherein said first end is supported on a surface proximate to said container. The at least one ramp is pivotally supported by distal ends of said at least one lever arms so as to be movable from a first position wherein said second end of said at least one ramp is positioned in front of said container to a second position wherein said second end of said at least one ramp is supported on said container as said shaft is rotated.

The shaft may be supported by a bracket connectable to said storage container below said door. The bracket may include a sleeve sized to receive and rotatably support said shaft therein. Each of said brackets may be securable within apertures through said storage container. The bracket may include a positioning plate sized and shaped to correspond to said aperture through said storage container. The bracket may include an outer clamping body and an inner clamping body surrounding said positioning plate wherein said inner body is drawable towards said outer clamping body.

The apparatus may further comprise a handle rigidly connected to said shaft. The handle may comprise a bar extending substantially parallel to and spaced apart from said shaft. The bar may extend between an inner two of said at least one lever arms.

The at least one ramp may comprise two ramps each extending between inner and outer edges. The inner two of said at least one lever arms may support said inner edges of said two ramps. The apparatus may further comprise two outer lever arms supporting said outer edges of said ramps.

According to a further embodiment of the present invention there is disclosed a kit for selectively providing access to a storage container having a door spaced above a floor of the container to provide access to an interior thereof, the kit comprising a shaft securable to said storage container at a position below said door and rotatable relative thereto and at least one lever arm extending from said shaft. The kit further includes at least one ramp extending between first and second ends, wherein said first end is operable to be supported on a surface proximate to said container. The at least one ramp is adapted to be pivotally supported by distal ends of said at least one lever arms so as to be movable from a first position wherein said second end of said at least one ramp is positioned in front of said container to a second position wherein said second end of said at least one ramp is supported on said container as said shaft is rotated.

The kit may further comprise a bracket having a sleeve sized to rotatably support said shaft therein, said bracket being securable to the storage container below said door. The bracket may include a positioning plate sized and shaped to correspond to said aperture through said storage container and an outer clamping body and an inner clamping body surrounding said positioning plate wherein said inner body is drawable towards said outer clamping body.

The kit may further comprise a handle extending substantially parallel to and spaced apart from said shaft rigidly supported between an inner two of said at least one lever arms. The kit may further comprise a lock adapted to be engage against said handle and a bottom portion of said storage container with said shaft therebetween and on an opposite side thereof to prevent rotation of said shaft. The kit may further comprise an elongate pry bar sized to pass between said handle and said shaft so as to be operable to rotate said shaft when lifted by a user.

According to a further embodiment of the present invention there is disclosed a method for selectively providing access to a storage container having a door spaced above a floor of the container to provide access to an interior thereof, the apparatus comprising rotatably securing a shaft to said storage container at a position below said door and pivotally supporting a portion of at least one ramp extending between first and second ends to lever arms extending radially from said shaft. The method further comprises rotating said shaft so as to move said at least one ramp from a first position wherein said second end of said at least one ramp is positioned in front of said container to a second position wherein said second end of said at least one ramp is supported on said container as said shaft is rotated.

The method may further comprise inserting a pry bar between said shaft and a handle parallel to and spaced apart from said shaft and lifting said pry bar so as to rotate said handle and said shaft.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
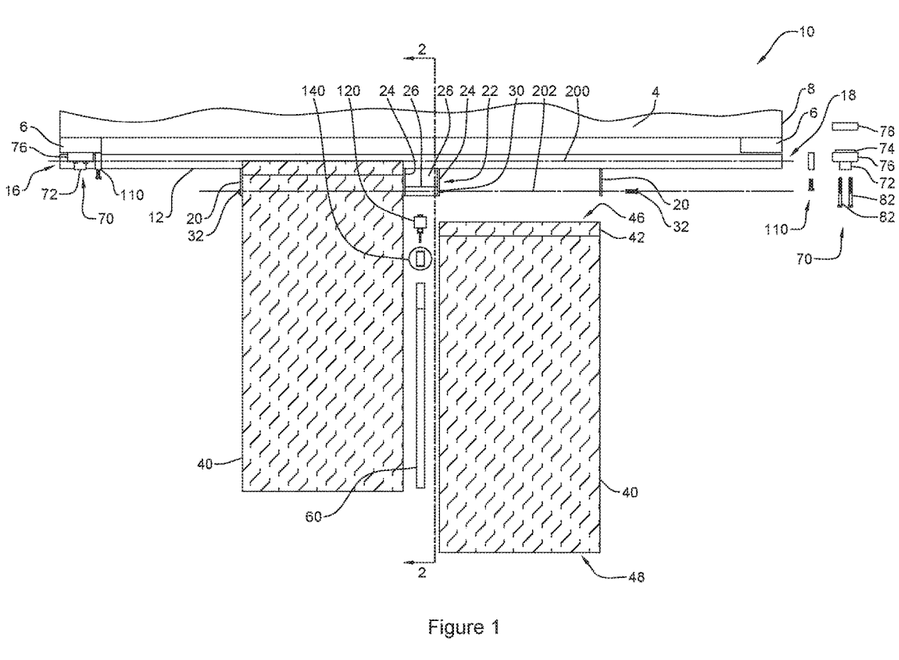
FIG. 1 is a top plan partially exploded view of a ramp assembly installed on a container in the first or lowered position according to a first embodiment of the present invention.
Figure 5:
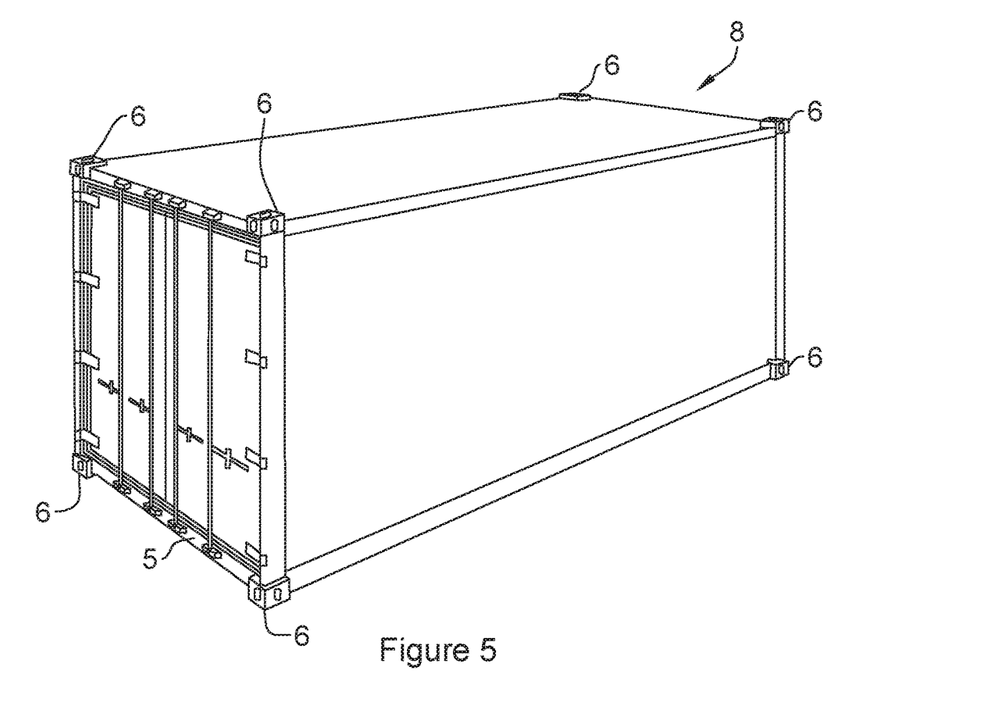
FIG. 5 is a perspective view of a standard shipping container.

Referring to FIG. 1, a ramp assembly for a standard shipping container according to a first embodiment of the invention is shown generally at 10. A standard intermodal or shipping container 8, having dimensions as specified by the ISO 668 standard, is shown in FIG. 5. ISO 668 defines a single standard external width of 8 feet (2.44 meters), whereas it defines multiple standard lengths and heights. For the present embodiment of the invention, only the width dimension of the container is relevant. Additionally, all shipping containers 8 have standard corner castings 6 such that they may be engaged with by handling equipment and standard corner locks during transport.

The ramp assembly 10 comprises a shaft 12, two end brackets 70, two incline sheets 40, a pry bar 60, an optional lock 120, and an optional base support 140. As will be described in more detail below, the end brackets 70 are attached to the corner fittings 6 of a container 8. The shaft 12 is rotatably supported by the end brackets 70 and secured in place with collars 110. The incline sheets 40 are attached to the shaft 12, as will be more fully described below. The ramp assembly 10 is raised with a pry bar 60. When in the raised position, the ramp may be secured in place with the lock 120. Optionally, a base support 140 may be located under a midpoint of the shaft 12 to provide additional support thereto.

Figure 4:
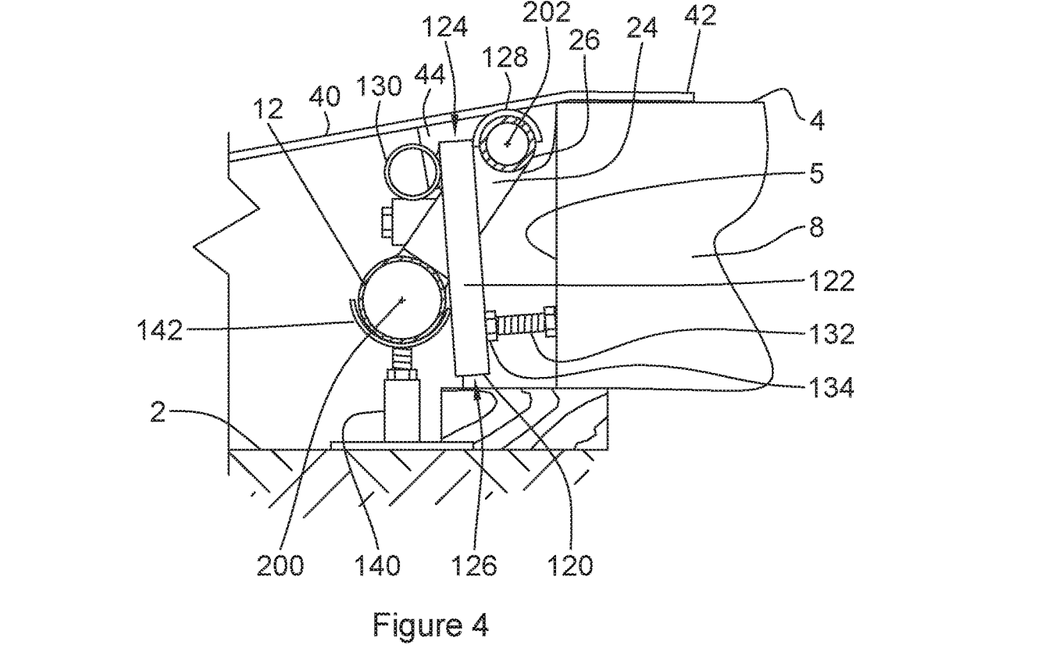
FIG. 4 is an enlarged detail cross-sectional view of the ramp of FIG. 1 taken along the line 2-2, in the second or raised position with a lock and support base installed.

As shown in FIG. 1, the shaft 12 comprises an elongate cylindrical shaft extending along an axis 200 between first and second ends, 16 and 18, respectively, two incline support brackets 20, and a central pivot portion 22 therebetween. The shaft 12 may have a length corresponding to the width of the container 8, such as, by way of non-limiting example, approximately 8 feet (2.44 meters). The diameter of the shaft 12 may be such as, by way of non-limiting example, in the range of ½ to 2½ inches (13 to 64 mm) and may selected to be hollow or solid. The central pivot portion 22 is located at the midpoint of the shaft 12, and includes two lever arms or brackets 24 extending perpendicular therefrom with a cylindrical incline handle or pivot shaft 26 extending along an incline pivot axis 202 at the distal end therebetween. It will also be appreciated that the pivot shaft 26 may be located along the shaft 12 at any position other than between the ramps so as to permit a user to raise and lower the ramps using a pry bar at a side of the ramps, by way of non-limiting example as will be more fully described below. The diameter of the incline pivot shaft 26 may be such as, by way of non-limiting example, in the range of ½ to 2½ inches (13 to 64 mm) and may selected to be hollow or solid. Proximate to the distal end of each bracket 24, a pivot pin 30 extends transversely outward along the incline pivot axis 202 and is sized to fit within a receiving bore (not shown) on an underside bracket 44 of each incline sheet 40. The parallel incline support brackets 20 extend perpendicular from the shaft 12, and are spaced apart from the central pivot portion 22 to fit the width of an incline sheet 40. The size and length of each incline support bracket 20 essentially matches the size and length of each bracket 24, with a transverse bore therethrough proximate to the distal end, along the pivot axis 202, such that a bolt 32 may be passed therethrough to be received within a receiving bore (not shown) on an underside bracket 44 of each incline sheet 40. The bolt 32 may be secured by a nut (not shown), as is commonly known. The length of the brackets 20 and 24 are sized relative to the diameter of each shaft 12 and 26, such that the top lip 42 of each incline sheet 40 engages with the floor 4 of the container 8 when in the second or raised position, as best seen in FIG. 4. The length of the incline pivot shaft 26, and therefore the distance between the brackets 24, may be such as, by way of non-limiting example, up to 8 inches (203 mm) forming a pivot gap 28 to receive a pry bar 60 therein as will be more fully described below.

Figure 2:
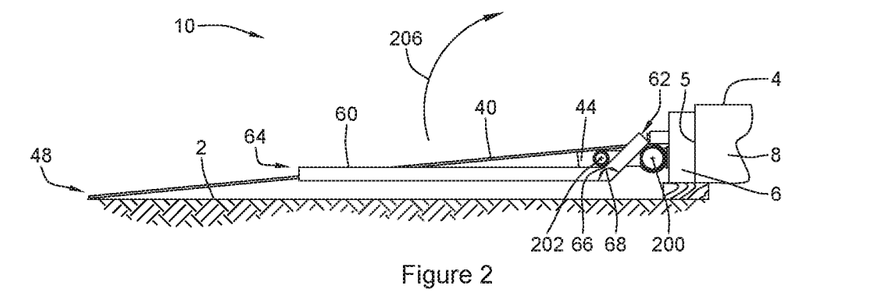
FIG. 2 is a cross-sectional view of the ramp of FIG. 1 taken along the line 2-2, in the first or lowered position with a pry bar inserted into the ramp for lifting.
Figure 3:
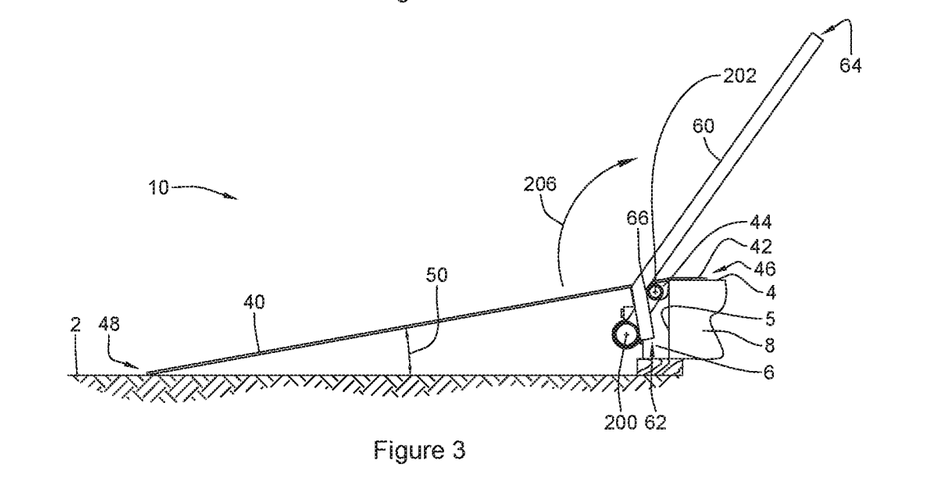
FIG. 3 is a cross-sectional view of the ramp of FIG. 1 taken along the line 2-2, in the second or raised position with a pry bar inserted into the ramp for lifting.

Turning now to FIGS. 2-4, each incline sheet 40 bridges the distance between the container floor 4 and the placement pad or ground 2, extending between first and second ends 46 and 48, respectively. The width of each incline sheet 40 may be such as, by way of non-limiting example, up to 42 inches (1066 mm) and spaced apart by the central pivot portion 22 of the ramp assembly 10 to accept the wheels of a forklift or a hand truck, by non-limiting example, thereon. The length of each incline sheet 40 may be sized such that the incline angle 50 in the raised position, as shown on FIG. 3, does not exceed 10% (5.7 degrees), or as recommended by the forklift manufacturer, as is commonly known. A lip 42, is formed on each incline sheet 40 proximate to the first end 46, which engages upon the floor 4 of the container 8 when in the raised position, as shown in FIGS. 3 and 4. Two perpendicular underside brackets 44 extend from a bottom of each side of each incline sheet 40, proximate to the first end 46 and distal to the lip 42. Each underside bracket 44 includes a transverse receiving bore therethrough (not shown), to be engaged upon by a pivot pin 30 or bolt 32, as seen in FIG. 1, such that the incline sheet 40 may pivot along the pivot axis 202 thereon. The length of each underside bracket 44 and the location of each receiving bore is sized such that when an incline sheet 40 is engaged with a pivot pin 30 and a bolt 32 onto the brackets 20 and 24, the edge of the lip 42 at the first end 46 of the incline sheet 40 rests on the shaft 12 in the lowered position, as illustrated in FIGS. 1 and 2.

Figure 6:
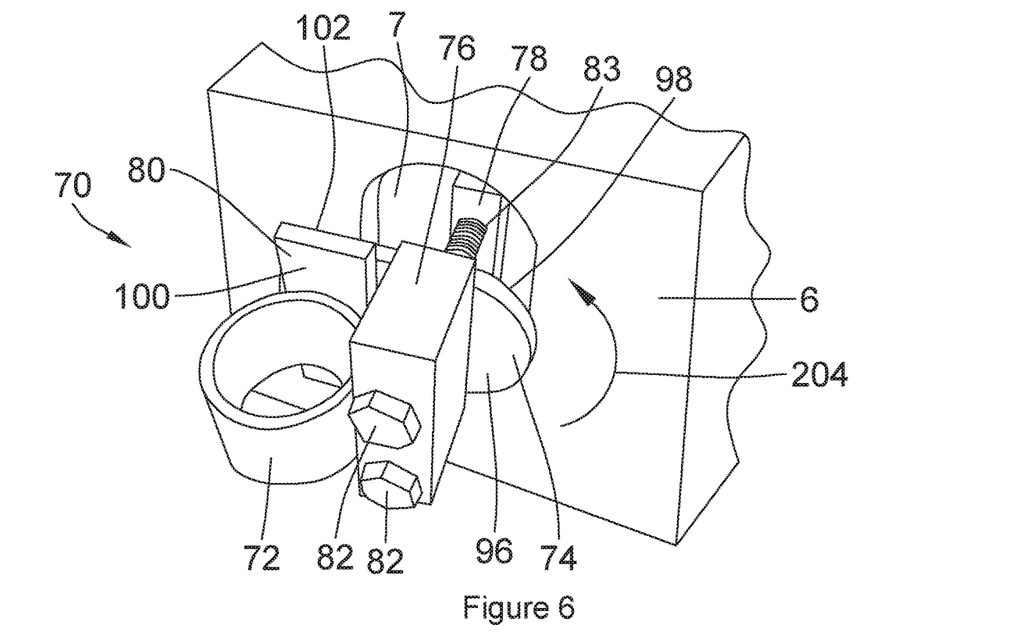
FIG. 6 is a perspective view of an end clamp for use with the ramp of FIG. 1 in the first rotated installation position.
Figure 7:
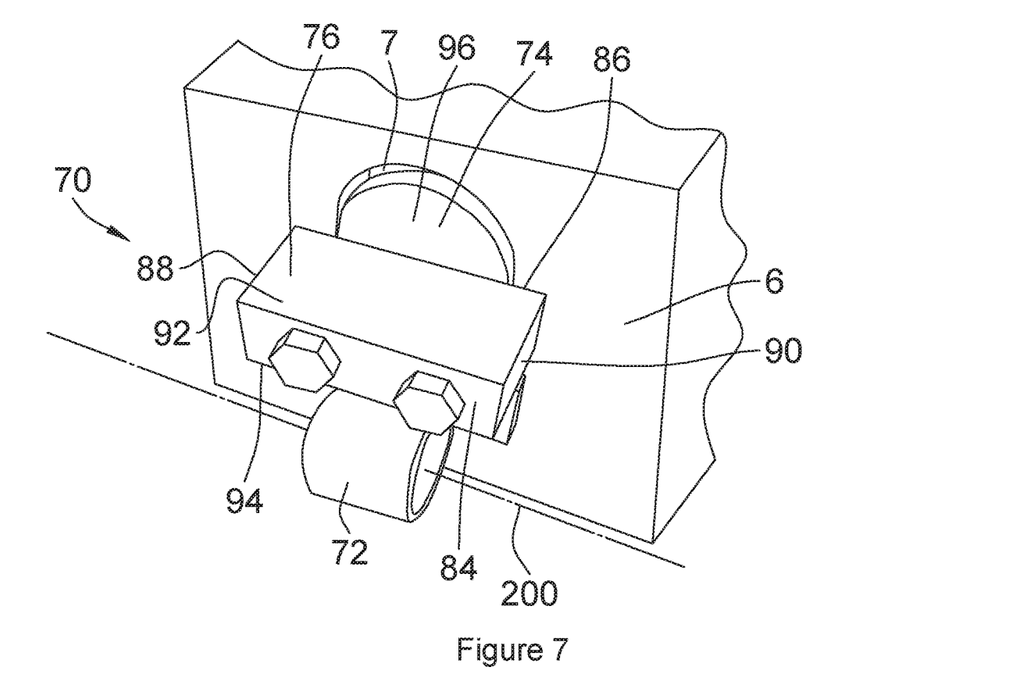
FIG. 7 is a perspective view of the end clamp of FIG. 6 in the second installed position.

Turning now to FIGS. 6 and 7, an end bracket 70 is illustrated in two positions. At the first position, shown in FIG. 6, the end bracket 70 is rotated to a position operable to install the end bracket 70 within a standard corner casting 6 of a container 8. FIG. 7 illustrates the final installed position of an end bracket 70 within the corner casting 6. Each end bracket 70 comprises an annular sleeve 72, a positioning body 74, an outside clamp 76, an inside clamp 78, a retaining lip 80, and two bolts 82. As is commonly known, all corner castings 6 have standard dimensions, and include a standard corner casting opening 7 on the bottom front face. The corner casting opening 7 is an oblong shape and has an opening width, or minor axis, commonly of 2 inches (51 mm) and an opening height, or major axis, commonly of 3⅛ inches (79 mm), with a rounded top and bottom. The positioning body 74, having front and back surfaces 96 and 98, respectively, is also oblong and is sized and shaped to correspond to the corner casting opening 7 so as to non-rotationally fit within the corner casting opening 7 when in the final installed position, as illustrated in FIG. 7. For reference, an oblong shape has a major axis along the long diameter and a minor axis along the narrow diameter, which meet in the centre of the oblong.

The outside clamp 76 is formed in a rectangular block, extending from front 84 to back 86, and from left side 88 to right side 90, and from top 92 to bottom 94. The back 86 is attached to the front surface 96 of the positioning body 74, such that it is centred over the minor axis of the positioning body 74. The width of the outside clamp 76 from left side 88 to right side 90 is larger than the minor axis of the opening 7 to extend to either side thereof in the secured position shown in FIG. 7. Two parallel bore holes passing from front 84 to back 86 of the outside clamp 76 and continuing through the positioning body 74 from front surface 96 to back surface 98 are spaced apart over the centre of the minor axis such that the distance therebetween is sized position each bore to pass through the positioning body 74 and are sized to receive the bolts 82 therethrough. The height of the outside clamp 76 from top 92 to bottom 94 is selected to provide stability and strength to the brackets such as, by way of non-limiting example, between ¼ and 2 inch (6 to 51 mm) although it will be appreciated that other dimensions for the outside clamp 76 may be useful, as well.

The inside clamp 78 has a similar width and height to the outside clamp 76, with two threaded bore holes 83 spaced apart to receive the two bolts 82 passing through the outside clamp 76 and the positioning body 74. The depth of the inside clamp 78 may be similar to the outside clamp. The bolts 82 are sized to be threadably received within the threaded bore holes 83 and are of a length sufficient to pass through the outside clamp 76, the positioning body 74 and the inside clamp 78 such that the front of the inside clamp 78 spaced apart from the back surface 98 of the positioning body 74 by a distance sufficient to permit insertion of the inside clamp 78 through the opening when they are fully extended.

A retaining lip 80 having a similar width to the outside clamp 76 and having front and back surfaces 100 and 102, respectively, is also attached to the front surface 96 of the positioning body 74, centred over the minor axis in a similar manner. The thickness of the retaining lip 80 between the front and back surfaces 100 and 102 is selected to provide sufficient strength thereto as is commonly known. An annular sleeve 72 is sized to receive the shaft 12 therethrough, allowing a slip fit so that the shaft 12 may freely rotate therein. The annular sleeve is attached to the front surface 100 of the retaining lip 80, centred over the minor axis of the positioning body 74, and positioned such that the central axis of the annular sleeve 72 is parallel to the minor axis of the positioning body 74 and aligns with the main shaft axis 200, parallel to the floor 4 of the container 8 when in the installed position as shown in FIG. 7.

Referring to FIG. 6, when in the first position, the end bracket 70 is rotated 90 degrees relative to the corner casting opening 7, and the positioning body 74 cannot pass through the opening 7 as the height or major axis of the positioning body 74 is greater than the width or minor axis of the corner casting opening 7. The width of the inside clamp 78 is less than the height or major axis of the opening 7, and therefore can easily be passed therethrough. The bolts 82 are at their maximum extended position as the outside clamp 76 is passed through the corner casting opening 7. Although the end bracket 70 is shown with the annular sleeve 72 rotated to the left of the corner casting opening 7, it may be appreciated that it could be installed with the annular sleeve 72 rotated to the right, as well.

With the inside clamp 78 within the corner casting 6, the end bracket 70 is rotated 90 degrees in the direction indicated at 204 such that the major and minor axes of the positioning body 74 align with the major and minor axes of the casting opening 7, respectively, as shown in FIG. 7. The positioning body 74 is positioned within the casting opening 7, and is restricted from passing therethrough as the width of the outside clamp 76 and retaining lip 80 are greater than the minor axis of the casting opening 7. The bolts 82 are engaged upon by a wrench or torquing tool, as is commonly known, to reduce the distance between the outside clamp 76 and the inside clamp 78, such that the inside clamp engages upon the inside of the corner casting 6.

To assemble the ramp assembly 10, the end brackets 70 are attached to the corner castings, as described above, on the opening end of the container 8. A retaining collar 110, is installed on each end of the shaft 12. Each retaining collar 110 is a formed as an annular ring sized to fit the shaft 12 therethrough, with a set screw fitting, as is commonly known. Each end of the shaft 12 is passed through an annular sleeve 72 of an end bracket 70. When the shaft 12 has been positioned such that it is centred between the two end brackets 70, the collars 110 are positioned proximate to each end bracket 70 on the shaft 12, as shown in FIG. 1, and the set screw fittings are engaged upon such that the shaft 12 remains in place within the end brackets 70. Subsequently, the incline sheets 40 are attached to the brackets 20 and 24, as described above.

To raise the ramp assembly 10 from the lowered position, as shown in FIG. 2, to the raised position, as shown in FIG.

3, a pry bar 60 is used. The pry bar 60, may have a square or any other cross-sectional construction, and extends between first to second ends, 62 and 64, respectively, with a bend 66, therebetween. The distance between the first end 62 and the bend 66 is such that the pry bar may be engaged upon the shaft 12 at the first end 62 and upon the pivot shaft 26 at the bend 66 when inserted into the pivot gap 28 from below. The pry bar pivot angle 68 may be such as, by way of non-limiting example, in the range of 120 to 150 degrees, such that the pry bar 60 may be easily inserted into the pivot gap 28 from below. While retaining engagement with the shaft 12 and the pivot shaft 26, the second end 64 of the pry bar 60 is lifted and rotated in the direction generally indicated at 206 until the ramp assembly 10 is in the raised position, as illustrated in FIG. 3. It will be appreciated that the bend permits the pry bar to engage both of the shaft 12 and the pivot shaft 26 as well as preventing slipping upon the pivot shaft 26.

Turning now to FIG. 4, the ramp assembly 10 is shown in the raised locked position. The pry bar 60 is then removed from the ramp assembly 10 prior to installing the lock 120 and base support 140. The lock 120 comprises a lock body 122 having a square or any other suitable cross-sectional construction extending between top 124 and bottom 126. A half cylinder sleeve 128 extends from the lock body 122 proximate to the top 124 and a threaded adjustable displacement bolt 132 and nut 134 extend from the lock body 122 below the half cylinder sleeve 128 proximate to the bottom 126. The lock body 122 is sized to fit with the pivot gap 28 such that the lock 120 engages upon the pivot shaft 26 and the shaft 12. The half cylinder sleeve 128 is attached to the lock body 122 proximate to the top 124 and is sized such that the diameter of the pivot shaft 26 fits within the inside diameter of the half cylinder sleeve 128. A handle 130 is attached to the lock body 122 proximate to the top 124 on the opposite side of the body from the half cylinder sleeve 128. The handle 130 is sized to be grasped by a user. Although the handle is shown as ring in the present embodiment of the invention, it may be appreciated that other shapes may be useful, as well. A nut 134 is attached to the lock body 122 proximate to the bottom 126, below the half cylinder sleeve, perpendicular to the cylinder sleeve axis, which is aligned with the pivot axis 102, with a transverse bore passing through the lock body 122 at the nut location such that the bolt 132 may be adjusted within the nut 134 and the lock body 122 to allow a variable length of exposed bolt 132. To engage the lock 120 in position, the lock 120 is positioned in the pivot gap 28 with the half cylinder sleeve 128 engaged with the pivot shaft 26 and the lock body 122 positioned between the shaft 12 and the exterior wall 5 of the container 8. It will be appreciated that the length of the bolt 132 may be adjusted such that the head of the bolt engages upon the wall 5, thereby locking the ramp assembly 10 into position and preventing accidental disengagement of the assembly.

For additional support, a base support 140 may be positioned under the shaft 12. The base support 140 is a screw jack, as is commonly known, with a half cylinder sleeve at the top sized to receive the shaft 12. The base support 140 may be adjusted in height, as is commonly known, such that it engages upon both the ground 2 and the shaft 12.

While specific embodiments of the invention have been described and illustrated, such embodiments should be considered illustrative of the invention only and not as limiting the invention as construed in accordance with the accompanying claims.

What is claimed is:

1. An apparatus for selectively providing access to a storage container having a door spaced above a floor of the container to provide access to an interior thereof, the apparatus comprising:
    a shaft securable to said storage container at a position below said door and rotatable relative thereto;
    at least one lever arm extending from said shaft; and
    at least one ramp extending between first and second ends, wherein said first end is supported on a surface proximate to said container;
    wherein said at least one ramp is pivotally supported by distal ends of said at least one lever arm so as to be movable from a first position wherein said second end of said at least one ramp is positioned in front of said container to a second position wherein said second end of said at least one ramp is supported on said container as said shaft is rotated.

2. The apparatus of claim 1 wherein said shaft is supported by a bracket connectable to said storage container below said door.

3. The apparatus of claim 2 wherein said bracket includes a sleeve sized to receive and rotatably support said shaft therein.

4. The apparatus of claim 2 wherein each of said brackets is securable within apertures through said storage container.

5. The apparatus of claim 4 wherein said bracket includes a positioning plate sized and shaped to correspond to said aperture through said storage container.

6. The apparatus of claim 5 wherein said bracket includes an outer clamping body and an inner clamping body surrounding said positioning plate wherein said inner body is drawable towards said outer clamping body.

7. The apparatus of claim 1 further comprising a handle rigidly connected to said shaft.

8. The apparatus of claim 7 wherein said handle comprise a bar extending substantially parallel to and spaced apart from said shaft.

9. The apparatus of claim 8 wherein said bar extends between an inner two of said at least one lever arm.

10. The apparatus of claim 1 wherein said at least one ramp comprises two ramps each extending between inner and outer edges.

11. The apparatus of claim 10 wherein said inner two of said at least one lever arm support said inner edges of said two ramps.

12. The apparatus of claim 11 further comprising two outer lever arms supporting said outer edges of said ramps.

13. A kit for selectively providing access to a storage container having a door spaced above a floor of the container to provide access to an interior thereof, the kit comprising:
    a shaft securable to said storage container at a position below said door and rotatable relative thereto;
    at least one lever arm extending from said shaft; and
    at least one ramp extending between first and second ends, wherein said first end is operable to be supported on a surface proximate to said container;
    wherein said at least one ramp is adapted to be pivotally supported by distal ends of said at least one lever arm so as to be movable from a first position wherein said second end of said at least one ramp is positioned in front of said container to a second position wherein said second end of said at least one ramp is supported on said container as said shaft is rotated.

14. The kit of claim 13 further comprising a bracket having a sleeve sized to rotatably support said shaft therein, said bracket being securable to the storage container below said door.

15. The kit of claim 14 wherein said bracket includes a positioning plate sized and shaped to correspond to said aperture through said storage container and an outer clamping body and an inner clamping body surrounding said positioning plate wherein said inner body is drawable towards said outer clamping body.

16. The kit of claim 13 further comprising a handle extending substantially parallel to and spaced apart from said shaft rigidly supported between an inner two of said at least one lever arm.

17. The kit of claim 13 further comprising a lock adapted to be engaged against said handle and a bottom portion of said storage container with said shaft therebetween and on an opposite side thereof to prevent rotation of said shaft.

18. The kit of claim 13 further comprising an elongate pry bar sized to pass between said handle and said shaft so as to be operable to rotate said shaft when lifted by a user.

19. A method for selectively providing access to a storage container having a door spaced above a floor of the container to provide access to an interior thereof, the apparatus comprising:
- rotatably securing a shaft to said storage container at a position below said door;
- pivotally supporting a portion of at least one ramp extending between first and second ends to lever arms extending radially from said shaft; and
- rotating said shaft so as to move said at least one ramp from a first position wherein said second end of said at least one ramp is positioned in front of said container to a second position wherein said second end of said at least one ramp is supported on said container as said shaft is rotated.

20. The method of claim 19 further comprising inserting a pry bar between said shaft and a handle parallel to and spaced apart from said shaft and lifting said pry bar so as to rotate said handle and said shaft.

* * * * *